US007844103B2

(12) United States Patent
Tirosh

(10) Patent No.: US 7,844,103 B2
(45) Date of Patent: Nov. 30, 2010

(54) MICROSCOPIC INSPECTION APPARATUS FOR REDUCING IMAGE SMEAR USING A PULSED LIGHT SOURCE AND A LINEAR-PERIODIC SUPERPOSITIONED SCANNING SCHEME TO PROVIDE EXTENDED PULSE DURATION, AND METHODS USEFUL THEREFOR

(75) Inventor: Ehud Tirosh, Mevaseret Zion (IL)

(73) Assignee: Applied Materials Israel, Ltd., Rehovot (IL)

( * ) Notice: Subject to any disclaimer, the term of this patent is extended or adjusted under 35 U.S.C. 154(b) by 1084 days.

(21) Appl. No.: 11/549,059

(22) Filed: Oct. 12, 2006

(65) Prior Publication Data

US 2009/0279776 A1    Nov. 12, 2009

Related U.S. Application Data

(60) Provisional application No. 60/725,902, filed on Oct. 12, 2005.

(51) Int. Cl.
*G06K 9/00* (2006.01)

(52) U.S. Cl. ............... 382/151; 382/103; 382/106; 382/107; 382/141; 382/142; 382/143; 382/144; 382/145; 382/146; 382/147; 382/148; 382/149; 382/150; 382/152

(58) Field of Classification Search ............... 382/103, 382/106, 107, 133, 141–152
See application file for complete search history.

(56) References Cited

U.S. PATENT DOCUMENTS

| 2,943,505 | A | * | 7/1960 | Parks | 475/16 |
| 4,958,373 | A | * | 9/1990 | Usami et al. | 382/149 |
| 2001/0048082 | A1 | * | 12/2001 | Osipchuk et al. | 250/458.1 |
| 2003/0174902 | A1 | * | 9/2003 | Barkan | 382/274 |
| 2005/0089208 | A1 | * | 4/2005 | Dong et al. | 382/133 |
| 2006/0088201 | A1 | * | 4/2006 | Delaney | 382/152 |

FOREIGN PATENT DOCUMENTS

WO    WO 2004025331 A2 *  3/2004

* cited by examiner

*Primary Examiner*—Vikkram Bali
*Assistant Examiner*—Daniel Zeilberger
(74) *Attorney, Agent, or Firm*—SNR Denton US LLP

(57) ABSTRACT

An automated optical inspection system includes a pulsed light source illuminating an article to be inspected thereby to generate at least one image thereof, at least one camera having a field of view, and a relative motion provider operative to provide relative motion between the camera and at least one image of at least a portion of the article. The relative motion provider may include a first continuous motion provider and a second, velocity-during-imaging-lessening motion provider. The relative motion is a superposition of a first continuous component of motion provided by the first motion provider and a second, smaller component of motion provided by the second motion provider which lessens the velocity of the at least one image relative to the camera, during imaging.

18 Claims, 6 Drawing Sheets

MICROSCOPIC INSPECTION APPARATUS FOR REDUCING IMAGE SMEAR USING A PULSED LIGHT SOURCE AND A LINEAR-PERIODIC SUPERPOSITIONED SCANNING SCHEME TO PROVIDE EXTENDED PULSE DURATION, AND METHODS USEFUL THEREFOR

RELATED APPLICATIONS

The present application is a non-provisional of and claims priority to co-pending U.S. Provisional Application No. 60/725,902, filed 12 Oct. 2005, entitled "Reducing image smear with LEDs using linear-sine scan (LISI) with extended pulse duration", incorporated herein by reference.

FIELD OF THE INVENTION

The present invention relates generally to automatic optical inspection of objects with microscopic features and specifically to scanning schemes useful in conjunction therewith.

BACKGROUND

A wide variety of automatic optical inspection systems, such as those marketed by Applied Materials, Orbotech, KLA and Negevtech, are known.

SUMMARY OF THE INVENTION

The present invention seeks to provide improved methods and systems for automatic optical inspection of objects with microscopic features, such as but not limited to wafers, flat panel displays, and integrated circuits. According to certain embodiments of the present invention, a linear scan with a slight sine modulation is used, thereby to create time intervals in which a stage holding an object to be inspected, is virtually at rest. This enables use of light pulses, e.g., pulses of LED (light-emitting diode) illumination, having a relative long duration hence a desirably high per-pulse energy content. Since the light energy of light emitting diodes (LEDs) is substantially proportional to their pulse duration, a higher signal-to-noise ratio (SNR) and in addition or alternatively, a higher average scanning speed may thereby be achieved, without smearing the resulting image.

Generally, conventional microscopic feature inspection systems for inspection of objects with microscopic features, such as wafers, use two main image acquisition schemes: scanning schemes and strobing schemes. In scanning schemes, the scanning stage which holds the object is linear in that it moves at a constant velocity, a light source illuminates the object continuously, and a detector collects the image sequentially. Light sources suitable for implementing this scheme include continuous laser sources or continuous light sources such as a Xe lamp. The detectors used include a linear CCD array, a CCD-TDI array, or a photomultiplier in case of a laser spot scanner. In strobing schemes, the stage also moves at a constant speed but the object is illuminated with a pulsed source such as a pulsed laser or a flash lamp. The image is grabbed using a 2D array such as a 2D CCD array or an MOS array. To avoid image smear, the flash pulse duration and stage velocity are adjusted so that the stage movement during the pulse duration is smaller than, typically, one pixel.

High power LEDs, such as those manufactured by Philips Lumileds Lighting Company, 370 West Trimble Road, San Jose, Calif., 95131 USA, may be used as an alternative, significantly less expensive light source for inspection. However, their use as a pulsed source for strobing imaging schemes is limited because, unlike lasers or flash lamps, they cannot generate short pulses with high enough instantaneous power. In fact, their power is limited by the instantaneous current, and the latter cannot be increased significantly, even for short pulses, without damaging the LED.

The present invention seeks to provide a scanning scheme which effectively uses LEDs as a cost-effective alternative for a pulsed light source for the strobing scheme. According to a preferred embodiment of the present invention, the linear scanning scheme which is provided in conventional microscopic inspection systems is replaced by a scheme which provides an object velocity, relative to the scanning components whose velocity is a superposition of the conventional linear velocity and a harmonic velocity such as a sine-shaped velocity. While this scanning scheme may be designed to maintain the average scanning speed, it provides for periods with very small speed, which enables to use the LEDs with longer pulse durations, up to 2 orders of magnitude, during those periods, without increasing the image smear.

There is thus provided, in accordance with an embodiment of the present invention, an automated optical inspection system comprising: a pulsed light source illuminating an article to be inspected thereby to generate at least one image thereof, at least one camera having a field of view; and a relative motion provider operative to provide relative motion between at least one camera and at least one image of at least a portion of the article, and wherein the relative motion provider comprises a first continuous motion provider and a second, velocity-during-imaging-lessening motion provider and wherein the relative motion is a superposition of a first continuous component of motion provided by the first motion provider and a second, smaller component of motion provided by the second motion provider which lessens the velocity of at least one image relative to the camera, during imaging.

Also provided, in accordance with an embodiment of the present invention, is an automated optical inspection method comprising providing a first continuous motion provider and a second, velocity-during-imaging-lessening motion provider, and providing relative motion between at least one camera and at least one image of at least a portion of the article, wherein the relative motion is a superposition of a first continuous component of motion provided by the first motion provider and a second, smaller component of motion provided by the second motion provider which lessens the velocity of at least one image relative to the camera, during imaging.

Further provided, in accordance with an embodiment of the present invention, is a method for inspecting an article, comprising bringing at least a portion of the article into fields of view of at least one of a plurality of objective modules, adjusting an image selection mirror mechanism to sequentially direct images of the field of view from the objective modules to at least one camera which is shared by the objective modules and which has a field of view, capturing the images with the shared camera, processing the captured images to detect defects in the article; and lessening motion of at least one image of the article within the field of view of at least one camera, during image capture by the camera.

BRIEF DESCRIPTION OF THE DRAWINGS

Embodiments of the present invention are illustrated by way of example (but not limitation) in the figures of the accompanying drawings, in which.

DETAILED DESCRIPTION

Figure 1A:
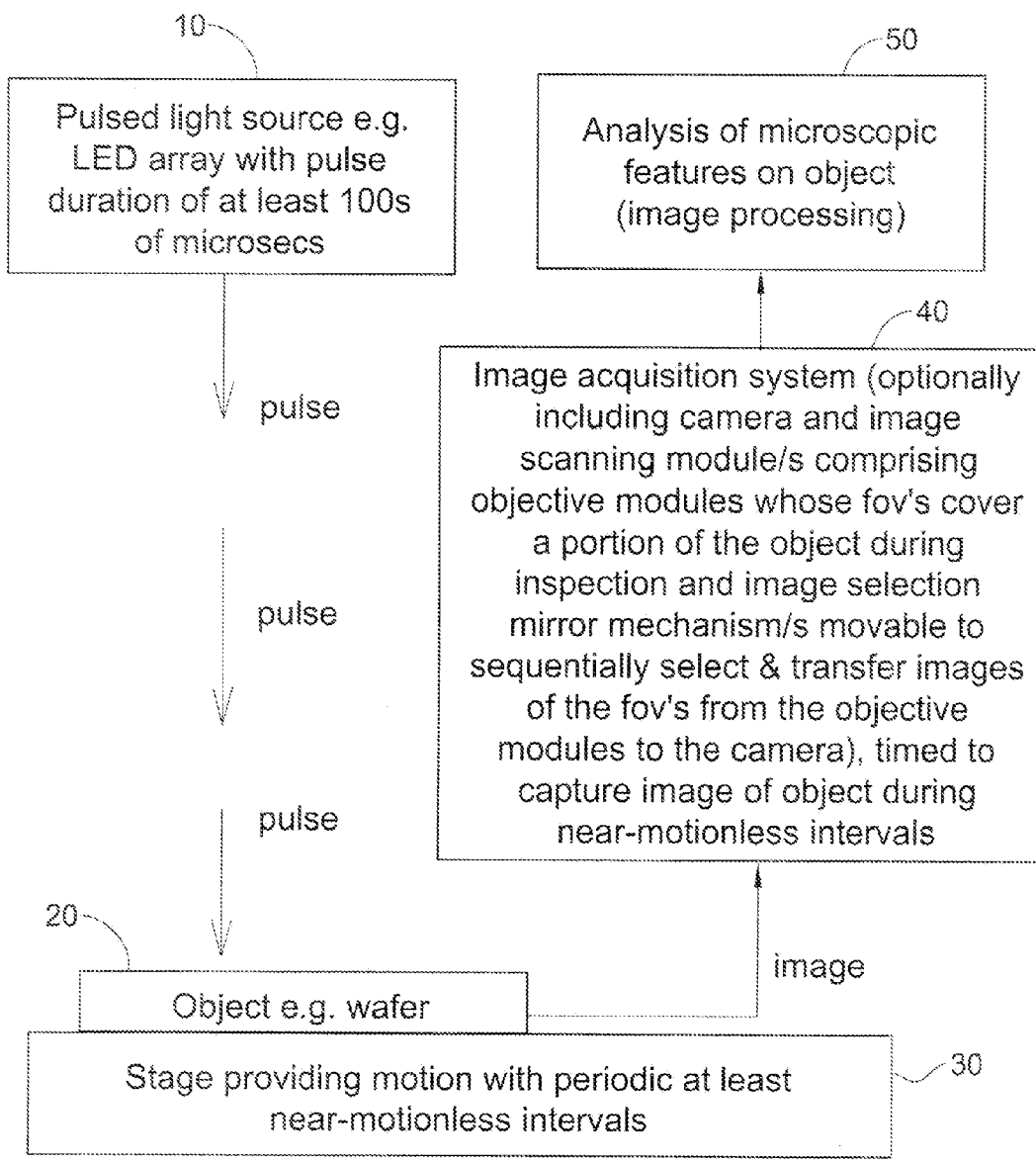
FIG. 1A is a simplified functional block diagram of a system for automatic optical inspection of objects constructed and operative in accordance with an embodiment of the present invention.

Reference is now made to FIG. 1A which is a simplified functional block diagram of a system for automatic optical inspection of objects constructed and operative in accordance with a preferred embodiment of the present invention. As shown, a pulsed LED array providing illumination whose pulse duration is, preferably, at least hundreds of microseconds, illuminates an object 20 with microscopic features to be inspected. The object 20 typically rests on a conventional x-y stage characterized in that the stage moves the object vis-à-vis the image acquisition system 40, or vice versa, such that the resulting relative motion is characterized by repeated, preferably periodic, at least near-motionless intervals. The operation of the image acquisition system 40 is timed such that images of the object are captured during these near-motionless intervals. The output of the image acquisition system 40 is analyzed by a conventional image processing unit so as to provide inspection data pertaining to the microscopic features on object 20. The periodicity of the relative motion may, for example, be achieved by harmonic relative motion or by any other periodic relative motion such as saw-tooth motion.

Figure 1B:
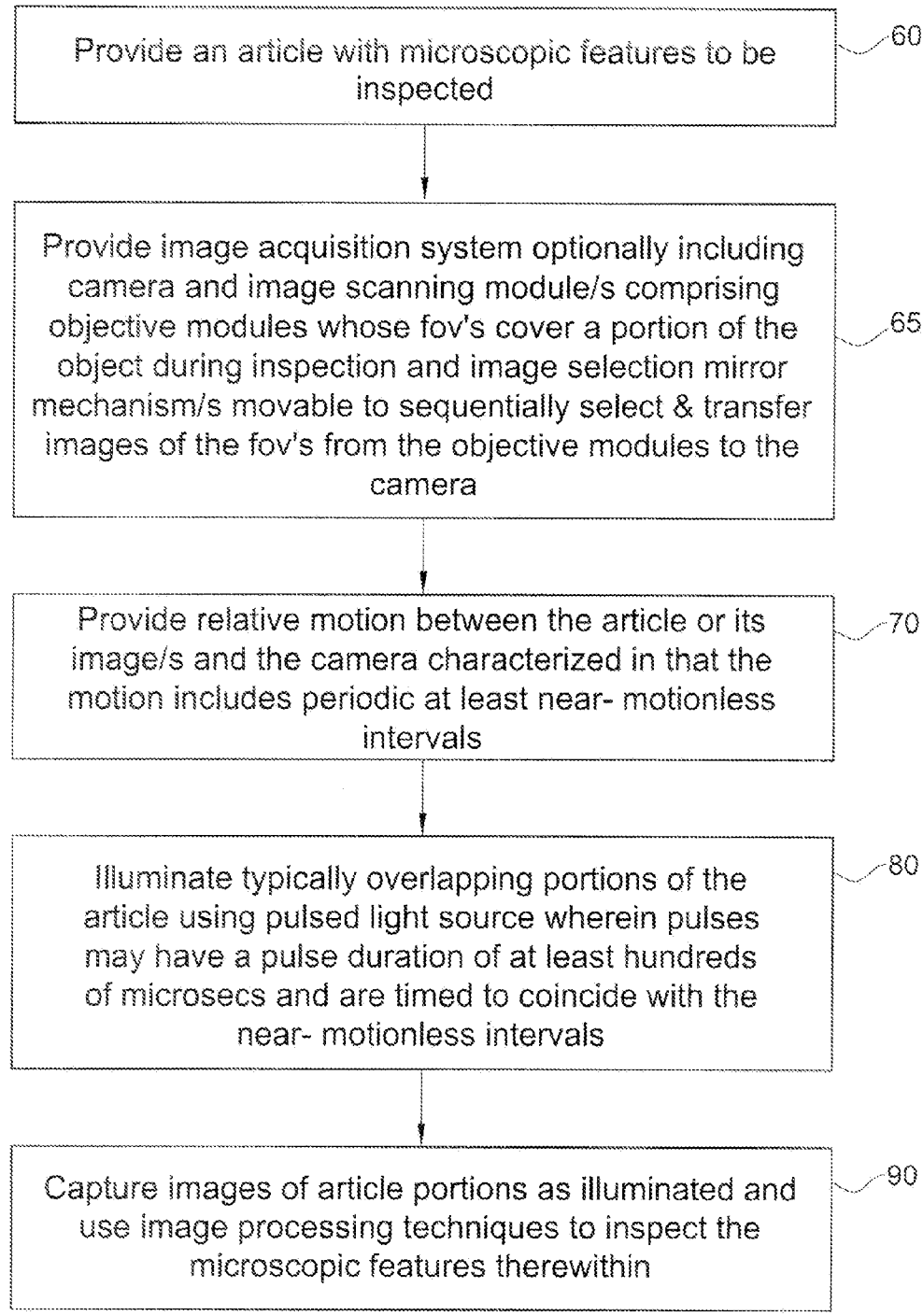
FIG. 1B is a simplified flowchart illustration of a method for automatic optical inspection of objects constructed and operative in accordance with an embodiment of the present invention.

Reference is made to FIG. 1B which is a simplified flowchart illustration of a method for automatic optical inspection of objects constructed and operative in accordance with a preferred embodiment of the present invention. As shown, in step 60, an article with microscopic features to be inspected is provided and is typically supported on a stage. In step 70, relative motion is provided between the image of the article and the camera (e.g.: relative motion between the article itself and the camera, or optical motion of the image relative to the camera) which relative motion is characterized in that it includes periodic at least near-motionless intervals. In step 80, overlapping portions of the article are illuminated sequentially until the entire surface of the article or relevant portion thereof is illuminated and imaged, using pulsed LEDs, wherein pulses have a pulse duration of at least hundreds of microseconds and are timed to coincide with the near-motionless intervals. In step 90, images of the article portions as illuminated are captured and image processing techniques are used to inspect the microscopic features therewithin.

It is appreciated that a sequence of images is generated in accordance with an embodiment of the invention, each image in the sequence representing a portion of the object's surface area which portions together cover the object's surface area. Each such image preferably moves relative to the camera as described herein in detail.

Figure 2:
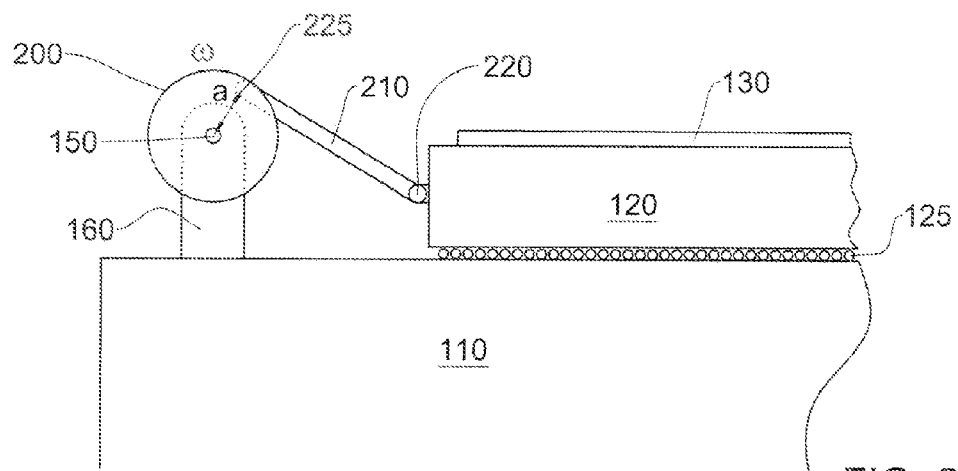
FIG. 2 is simplified side-view illustration of apparatus for providing relative motion, between object and imaging apparatus, the relative motion having periodic at least near-motionless intervals, constructed and operative in accordance with an embodiment of the present invention.
Figure 3:
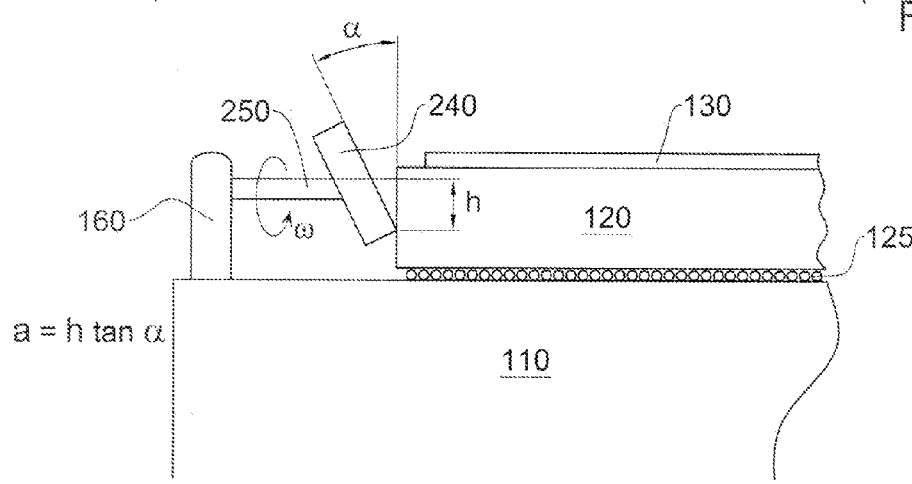
FIG. 3 is simplified side-view illustration of apparatus for providing relative motion, between object and imaging apparatus, the relative motion having periodic at least near-motionless intervals, constructed and operative in accordance with a further embodiment of the present invention.
Figure 4:
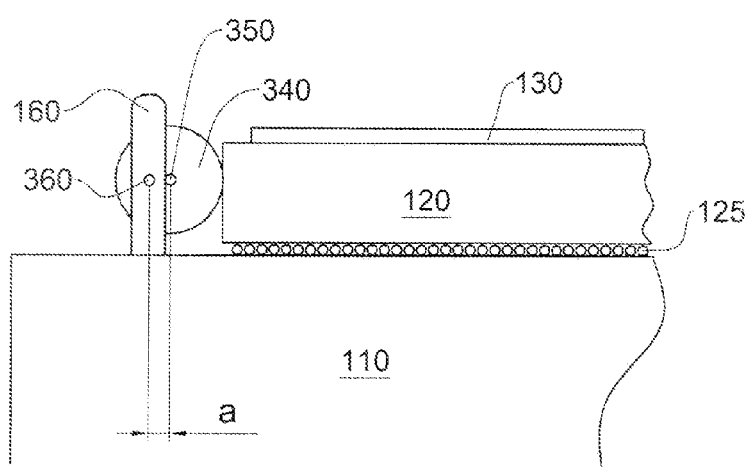
FIG. 4 is simplified side-view illustration of apparatus for providing relative motion, between object and imaging apparatus, the relative motion having periodic at least near-motionless intervals, constructed and operative in accordance with yet another embodiment of the present invention.

FIGS. 2-6 are examples of methods for imparting a superposition of relatively large-scale linear motion and smaller scale, repetitive, typically periodic motion such as harmonic motion, to the object (FIGS. 2-4) or to its image (FIGS. 5-6), relative to the scanning system. This superposition of two types of motion, which are typically provided by separate mechanisms, is also termed herein a "scan motion". It is appreciated that relative motion of a an object or image thereof, relative to a scanning system, may comprise motion of the object or image relative to the camera and/or motion of the camera relative to the object or image. The embodiment of FIG. 2 uses a rotating wheel and a shaft which provide periodic motion with a relatively large amplitude. The embodiment of FIG. 3 also uses a rotating tilted wheel to provide periodic motion with a relatively small amplitude. In the embodiment of FIG. 4, the periodic motion component, also having a relatively small amplitude, is imparted by a rotating eccentric wheel.

Figure 5:
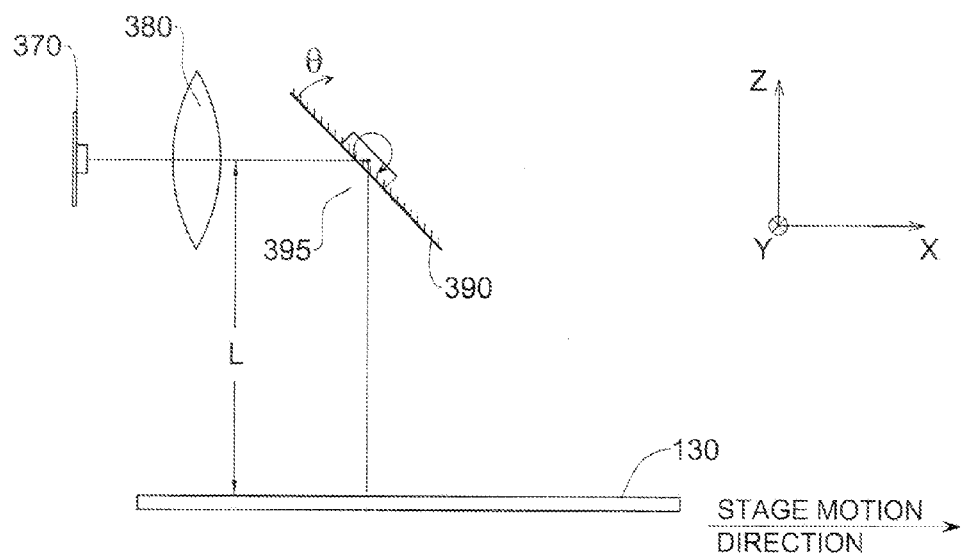
FIG. 5 is simplified side-view illustration of apparatus for providing relative motion, between object and imaging apparatus, the relative motion having periodic at least near-motionless intervals, constructed and operative in accordance with still another embodiment of the present invention.
Figure 6:
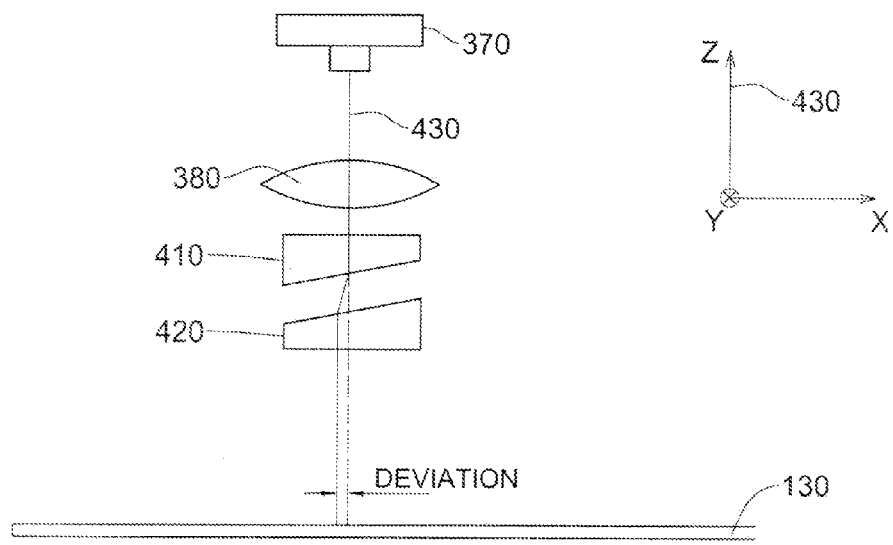
FIG. 6 is simplified side-view illustration of apparatus for providing relative motion, between object and imaging apparatus, the relative motion having periodic at least near-motionless intervals, constructed and operative in accordance with a further embodiment of the present invention.

In the embodiment of FIG. 5, a mirror located along the optical path provides the desired scan motion by vibrating angularly, in accordance with a periodic angular position vs. time variation scheme such as a sinusoidal scheme, around an axis 395 situated along a direction parallel to the y axis, thereby to generate harmonic relative motion of the article's image vis a vis the camera. Image capture can then be timed to coincide with near-motionless time intervals. In FIG. 6, the desired scan motion is provided by a pair of oppositely rotating wedges disposed along the optical path which generate relative linear harmonic motion of the article's image vis a vis the camera.

According to an embodiment of the present invention, a periodic scan-imparting stage is placed on top of the linear scan-imparting stage, as shown in FIGS. 2-4.

In FIG. 2, a periodic motion stage or platform 120 rests, via intervening bearings 125, on a linear stage or platform 110. The stage 120 is translated at a velocity that varies harmonically with time, as shown. The periodic motion stage 120 may comprise any suitable supporting element which can fixedly and removably support an article 130 such as a wafer, flat panel display or integrated circuit. A wheel 200 having an axis 150 and actuated by a motor 160, is coupled to the periodic motion stage 120 by means of a shaft 210 defining two axes 220 and 225. The motor 160, wheel 200 and shaft 210 impart motion to the periodic motion stage 120 which is in fact not exactly sinusoidal. The discrepancy between the motion imparted and sinusoidal motion depends on the ratio between the distance between the two axes (220 and 225) and the radius of rotation of the shaft 210 (which is the distance between axes 150 and 225, also termed herein a). a is equal to the amplitude of the periodic motion imparted to the article 130 via the harmonic motion stage 120. For a ratio of 10 the maximal discrepancy from sinusoidal motion is approximately 5%. Generally the motion imparted to the article 130 via the harmonic motion stage 120 may include any periodical motion and need not be specifically sinusoidal. The amplitude of periodic motion is typically small both relative to the dimensions of the stage 120 and relative to the size of the system's field of view.

In FIG. 3, a periodic motion stage or platform 120 rests, via intervening bearings 125, on a linear stage or platform 110. The stage 120 is translated at a velocity that varies harmonically with time, as shown. The periodic motion stage 120 may comprise any suitable supporting element which can fixedly and removably support an article 130 such as a wafer, flat panel display or integrated circuit. A tilted wheel 240 actuated by a motor 160, contacts the periodic motion stage 120. The motor 160 and tilted wheel 240 impart motion to the periodic motion stage 120 which is a good approximation to sinusoidal. Generally the motion imparted to the article 130 via the harmonic motion stage 120 may include any repetitive, typically periodic motion and need not be specifically sinusoidal. The amplitude of periodic motion is typically small both relative to the dimensions of the stage 120 and relative to the size of the system's field of view. The periodic motion stage 130 is spring-loaded against a tilted wheel 240. The vertical distance between the tilted wheel's contact point with the periodic stage 120 and the tilted wheel's axis 250, h, together with the tilt angle α, determine the amplitude a of the sinusoidal motion imparted to the stage 120 according to the equation:

$$a = h \cdot \tan(\alpha).$$

In the embodiment of FIG. 4, the stage is spring-loaded against the wheel 4 by a spring (not shown). The geometrical center 350 of the eccentric wheel 340 and its center of rotation 360 are separated by a distance a, such that a pseudo-sinusoidal motion having an amplitude of a is achieved. As in the embodiment of FIG. 2, the motion is not exactly sinusoidal. The wheel need not be circular and may for example be ellipsoidal.

In the embodiment of FIG. 5, light travels from the camera 370 through the lens 380 to a mirror 390 which rotates about the y axis 395 as shown, with a periodic angular velocity, preferably sinusoidal, as described herein. Other motion schemes, such as sawtooth motion schemes, are also possible. Motion of the mirror 390 is activated by a motor (not shown) such as a galvanometer type motor. As explained above, the angle θ of the mirror 390 typically varies sinusoidally as a function of time, e.g. according to the following equation:

$$\theta = \theta_0 \sin \omega t, \quad (i)$$

$\theta_0$ being set such that $\theta_0 L = a$, where a is the linear sine amplitude.

In FIG. 6, as shown, wedges 410 and 420 rotate in opposite azimuthal directions about an axis 430. Specifically, wedges 410 and 420 may rotate around the z axis 430 at a radial velocity ω, e.g. clockwise and counter clockwise, respectively. The operation of the pair of wedges resulting in linear periodic image motion is now described.

If wedge 410 were to be used alone, a vertical ray directed to a point (0,0) at the object, would deviate and therefore would intersect object 130 at a different point, $(x_A, y_A) = (A \cos \omega t, A \sin \omega t)$, where A is determined, as known in the art, by the wedge angle, its thickness and its index of refraction. Similarly, if wedge 420 were to be used alone, a vertical ray directed to a point (0,0) at the object, would deviate and therefore would intersect object 130 at a point, $(x_B, y_B) = (A$ cos ωt, −A sin ωt). When both wedges, rotating simultaneously, are provided, the resulting deviation of the ray at the object is $(x,y) = (x_A, y_A) + (x_B, y_B) = (2A \cos \omega t, 0)$, which provides sinusoidal motion. In the illustrated embodiment the wedges are shown disposed between the object and the optics, by way of example, however this need not be the case and the wedges may alternatively be positioned at any suitable locations along the optical path.

A particular advantage of relative motion of at least one image of the article being inspected and the inspecting camera comprising a superposition of periodic motion and linear motion, relative to constant linear relative motion, is now described. Harmonic motion is used by way of example in the following explanation.

A conventional linear scan can be described as:

$$x = v_0 t \quad (ii)$$

where x is the position at time t, and $v_0$ is the constant linear velocity. For an allowable smear ε, the maximum pulse duration τ is given by:

$$\tau = \frac{\varepsilon}{v_0} \quad (iii)$$

The harmonic-superimposed-with-linear scan provided in accordance with a preferred embodiment of the present invention may be described by:

$$x = v_0 t + a \cdot \sin(\omega t) \quad (iv)$$

The velocity at t is given by the derivative of x, namely:

$$v = \dot{x} = v_0 t + a\omega \cos(\omega t) \quad (v)$$

In order to zero v, a should be set as follows:

$$a = -\frac{v_0}{\omega} \quad (vi)$$

and, therefore:

$$x(t) = v_0 \left( t - \frac{1}{\omega} \sin(\omega t) \right) = v_0 t \left( 1 - \frac{\sin(\omega t)}{\omega t} \right) \quad (vii)$$

Given an allowable smear ε, the allowable pulse duration τ may be determined using the following relationship:

$$\varepsilon = x\left(\frac{\tau}{2}\right) - x\left(-\frac{\tau}{2}\right) = v_0 \tau \left( 1 - \frac{\sin\left(\frac{\omega t}{2}\right)}{\frac{\omega t}{2}} \right) \quad (viii)$$

For ωτ/2<<1 this relation can be approximated by:

$$\varepsilon = \frac{v_0 \omega^2 \tau^3}{24} \quad (ix)$$

and, therefore, $$\tau = \left[ \frac{24\varepsilon}{v_0 \omega^2} \right]^{\frac{1}{3}} \quad (x)$$

which gives a cubic root dependence of τ on ε, rather than a linear dependence as for the linear scan case shown above. For example, assume the following parameters: Camera: 1000×1000 pixels, frame rate: 60 Hz, pixel size: 1 μm, field size: ~1000×1 μm=1 mm, stage velocity: ~1 mm×60 Hz=60 mm/sec, allowable smear: 1 pixel~1 μm.

Figure 7:
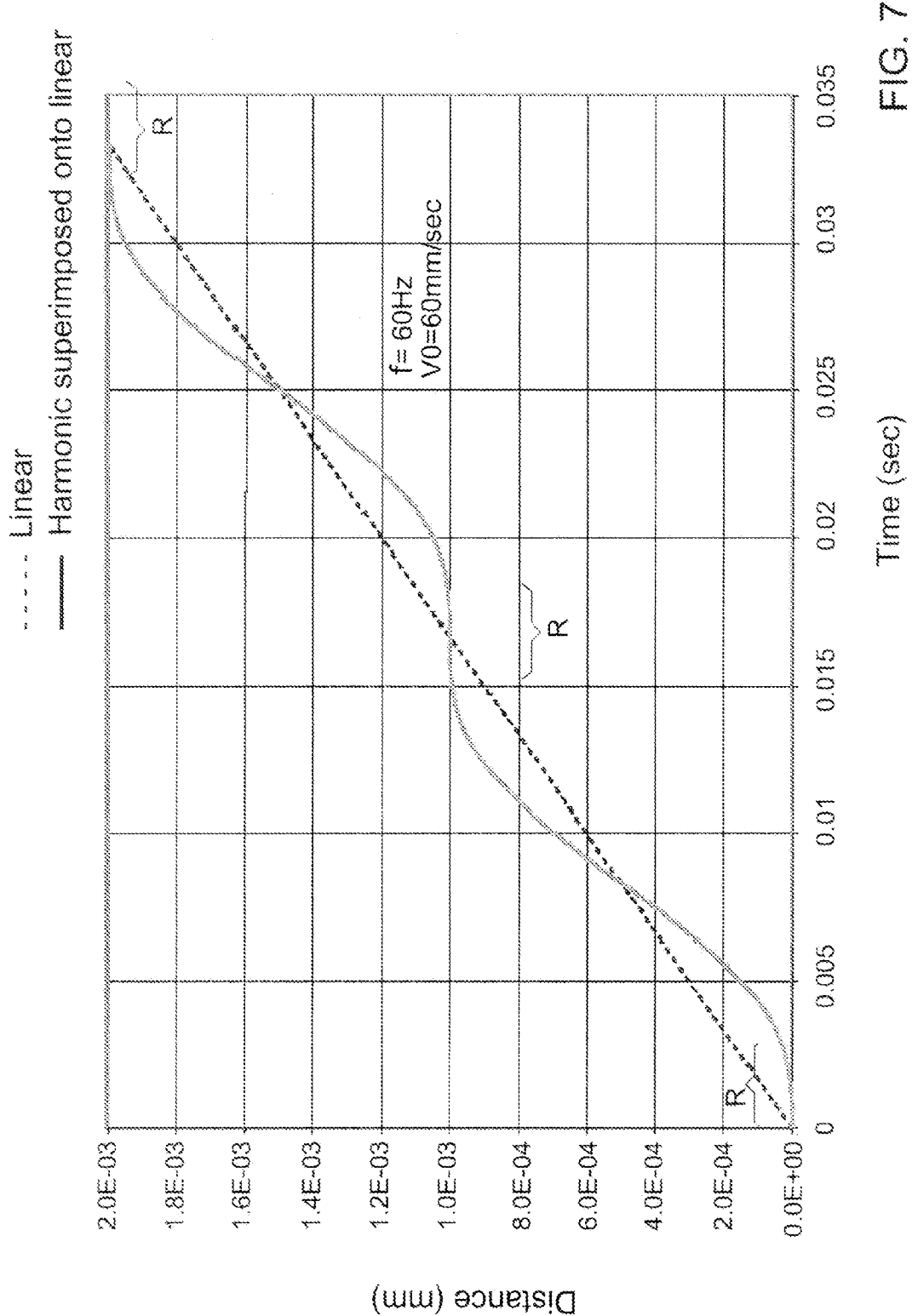
FIG. 7 is a simplified graph illustration of relative motion between an object and apparatus imaging the object, having periodic at least near-motionless intervals and provided in accordance with an embodiment of the present invention.

The displacement vs. time graph of FIG. 7 depicts relative displacement of an object vis a vis its scanning system as a function of time, using two different scanning profiles: conventional, linear scan, indicated by a dashed line and harmonic-superimposed-with-linear scan provided in accordance with a preferred embodiment of the present invention as indicated by a bold line. The frequency f, in the illustrated example, is 60 Hz and the average object-scanning system velocity is 60 mm/sec. The apparent near-zero velocity (horizontal) regions, R, during which an image may advantageously be captured, are clearly apparent in the graph of the harmonic-superimposed-with-linear scan.

A particular advantage of a preferred embodiment of the present invention, is that the allowable flash duration is much greater than in conventional systems, which makes use of high power LED sources feasible. An example of a suitable high power LED source is Lumiled's K2 product. Specifically, the allowable flash duration in conventional systems which use a linear scheme is as in:

$$\tau = \frac{\varepsilon}{v_0} = \frac{1 \text{ μm}}{60 \frac{\text{mm}}{\text{sec}}} = 16.7 \text{ μsec} \qquad (\text{ix})$$

whereas for the harmonic-superimposed-with-linear scan shown and described herein the allowable flash duration is approximately two orders of magnitude larger:

$$\tau = \left[\frac{24\varepsilon}{v_0 \omega^2}\right]^{\frac{1}{3}} = \left[\frac{24 \cdot 10^{-3}}{60 \cdot (2 \cdot \pi \cdot 60)^2}\right]^{\frac{1}{3}} = 1.4 \text{ msec} \qquad (\text{xii})$$

For a given linear velocity $v_0$ and pulse rate (which determines $\omega$), there is a unique value of sine amplitude a, given by:

$$a = \frac{v_0}{\omega} \qquad (\text{xiii})$$

In the above example:

$$a = \frac{v_0}{\omega} = \frac{60 \text{ mm} \cdot \text{sec}^{-1}}{2\pi \cdot 60 \text{ sec}^{-1}} = 0.16 \text{ mm}.$$

In certain embodiments (e.g. as in FIG. 5) in which $v_0$ and/or $\omega$ are variable, the amplitude a is adjustable.

Figure 8:
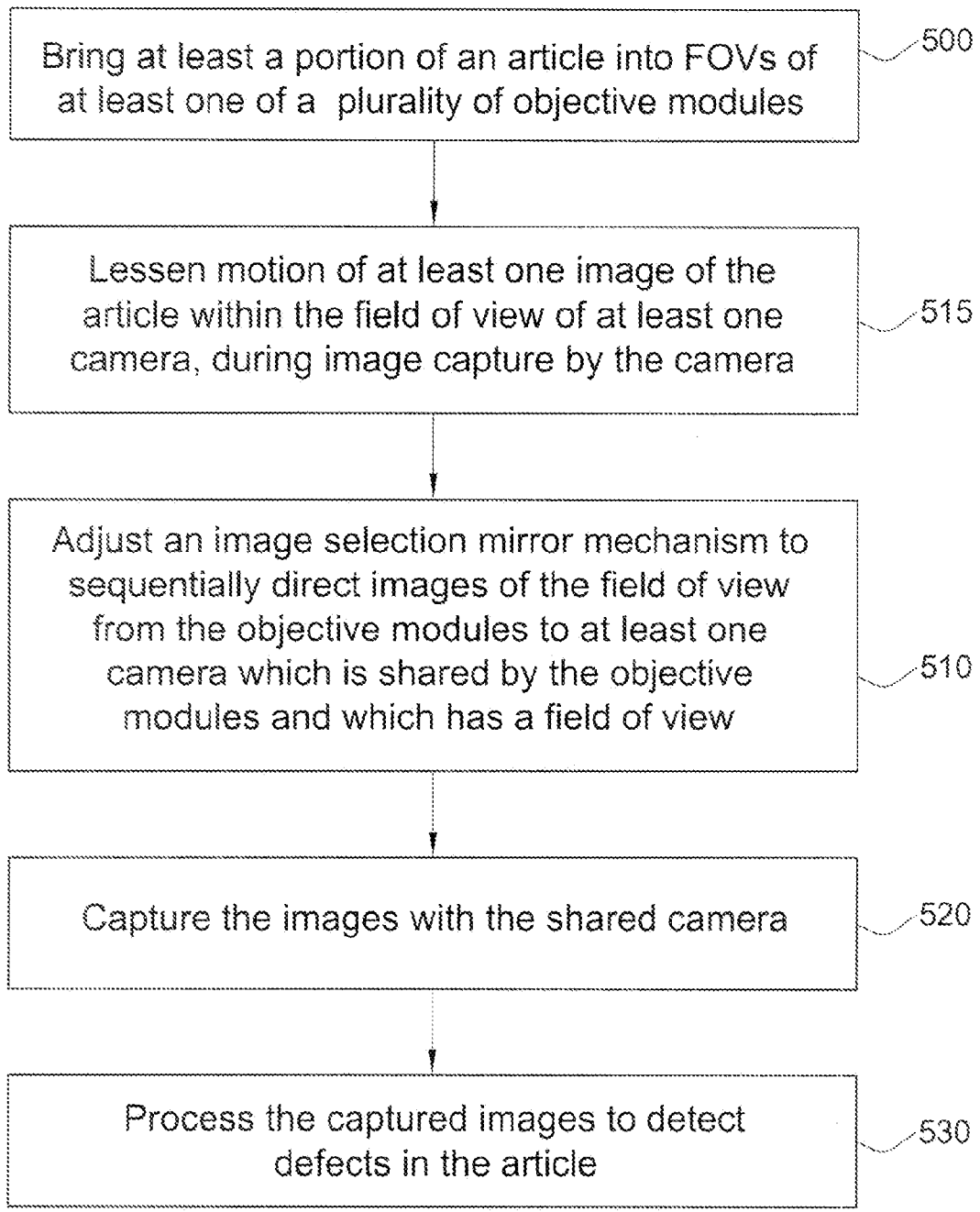
FIG. 8 is a simplified flowchart illustration of a method for automatic optical inspection of objects constructed and operative in accordance with another embodiment of the present invention and using multiple objectives.

It should be appreciated that the above invention is useful in conjunction with optical inspection systems utilizing multiple objectives per camera, such as the system described in co-pending U.S. Patent Application Publication No. 2006/0170910 A1 to Almogy et al., entitled "Automatic Optical Inspection Using Multiple Objectives", filed 31 Jan. 2005 and published 3 Aug. 2006, incorporated herein by reference. For example, an embodiment of the invention includes the inspection method of FIG. 8, including bringing at least a portion of an article or object into fields of view of at least one of a plurality of objective modules, adjusting an image selection mirror mechanism to sequentially direct images of the field of view from the objective modules to at least one camera which is shared by the objective modules and which has a field of view, capturing the images with the shared camera, processing the captured images to detect defects in the article, and lessening motion of at least one image of the article within the field of view of at least one camera, during image capture by the camera.

Also, in the system of FIG. 1A, the image acquisition camera may comprise at least one generally planar sensor defining an operative plane and the system may also comprise, as shown herein and e.g. in FIG. 2A of the above-referenced co-pending U.S. patent application publication, at least one image scanning module comprising a plurality of objective modules arranged to have fields of view covering a portion of the article during inspection and at least one image selection mirror mechanism movable to sequentially select and transfer images of the fields of view from the objective modules to the at least one camera, and apparatus for moving at least one sensor within the operative plane, during image capture, in a direction of motion of the image within the field of view of the camera caused by the relative motion between the article and at least one image scanning module.

One or both of the two components of the relative motion shown and described herein (the continuous motion component and/or the velocity-while-imaging-lessening component) may in accordance with an embodiment of the invention be provided by a programmable motor.

According to one embodiment of the invention, the system may comprise one or more computers or other programmable devices, programmed in accordance with some or all of the apparatus, methods, features and functionalities shown and described herein. Alternatively or in addition, the apparatus of the present invention may comprise a memory which is readable by a machine and which contains, stores or otherwise embodies a program of instructions which, when executed by the machine, comprises an implementation of some or all of the apparatus, methods, features and functionalities shown and described herein. Alternatively or in addition, the apparatus of the present invention may comprise a computer program implementing some or all of the apparatus, methods, features and functionalities shown and described herein and being readable by a computer for performing some or all of the methods of, and/or implementing some or all of the systems of, embodiments of the invention as described herein. It is appreciated that software components of the present invention may, if desired, by implemented in ROM (read only memory) form. The software components may, generally, be implemented in hardware, if desired, using conventional techniques.

Features of the present invention which are described in the context of separate embodiments may also be provided in combination in a single embodiment. Conversely, features of the invention which are described for brevity in the context of a single embodiment may be provided separately or in any suitable subcombination. All parameter values given herein are merely illustrative and are not intended to be limiting.

What is claimed is:

1. An automated optical inspection system, comprising:
   a pulsed light source illuminating an article to be inspected thereby;
   at least one camera having a field of view configured to capture at least one image of a portion of the article in the field of view; and
   a relative motion provider operative to provide relative motion between said at least one camera and the portion of the article in the field of view,
   wherein,
   said relative motion provider includes a continuous motion provider which provides a continuous motion at a constant velocity relative to the camera and a periodic motion provider on the constant motion provider which provides a variable velocity over time relative to the camera, said relative motion is a superposition of a continuous component of motion provided by the continuous motion provider and a periodic component of motion provided by the periodic motion provider which lessens the velocity of the article relative to the camera during imaging.

2. A system according to claim 1, wherein said relative motion is a superposition of linear motion and periodic motion, both as function of time.

3. A system according to claim 2 and further comprising an image stabilizer operative to lessen motion of at least one image of the article within the field of view of the at least one camera during capture of images by said camera.

4. A system according to claim 1 wherein said periodic motion comprises harmonic motion.

5. A system according to claim 1, wherein said relative motion is at a non-uniform velocity.

6. A system according to claim 5 wherein said relative motion comprises a segment of relative motion at a higher velocity range when the article is not being imaged and a segment of relative motion at a second lower velocity range when the article is being imaged.

7. A system according to claim 1 wherein said relative motion provider comprises an optical device operative to generate relative motion between said camera and an article by vibrating angularly around a vertical axis in accordance with the constant linear motion provider.

8. A system according to claim 7 wherein said optical device comprises a mirror disposed along an optical path extending between the at least one camera and the article whose angular position relative to an axis perpendicular to said path varies periodically as a function of time.

9. A system according to claim 7 wherein said optical device comprises a pair of oppositely rotating optical wedges disposed along an optical path extending between the at least one camera and the article, each having a rotational velocity which varies periodically as a function of time.

10. A system according to claim 1 wherein said pulsed light source comprises a high power LED light source illuminating said article during image capture by said at least one camera.

11. A system according to claim 1 wherein said relative motion provider provides relative motion between said at least one camera and the article which is effective change the portion of the article in the field of view of said at least one camera.

12. A system according to claim 1, wherein said at least one camera comprises at least one generally planar sensor defining an operative plane and wherein said system further comprises:

at least one image scanning module including a plurality of objective modules arranged to have fields of view covering a portion of the article during inspection;

at least one image selection mirror mechanism movable to sequentially select and transfer images of the fields of view from the objective modules to the at least one camera; and an apparatus for moving the sensor within said operative plane, during image capture, in a direction of motion of the image within the field of view of the camera caused by said relative motion between the article and the at least one image scanning module.

13. A method of automated optical inspection, comprising:

providing relative motion between at least one camera and an article under inspection using a continuous motion provider which provides a continuous motion at a constant velocity relative to the camera and a periodic motion provider on the continuous motion provider which provides a variable velocity relative to the camera over time, wherein, said relative motion is a superposition of a continuous component of motion provided by the continuous motion provider and a periodic component of motion provided by the periodic motion provider which lessens the velocity of the article relative to the camera during imaging.

14. A method according to claim 13, wherein said relative motion is the superposition of linear motion and periodic motion, both as functions of time.

15. A method according to claim 9, further comprising lessening motion of a portion of the article within a field of view of the at least one camera during capture of images by said camera.

16. A method according to claim 13, wherein said relative motion comprises harmonic motion.

17. A method according to claim 13, wherein said relative motion is at a non-uniform velocity.

18. A method according to claim 13 and further comprising using a high power LED light source to illuminate the article while the article is being imaged.

* * * * *